United States Patent
Buerk et al.

(10) Patent No.: US 12,478,383 B2
(45) Date of Patent: Nov. 25, 2025

(54) MEDICAL INSTRUMENT HAVING A BALL BEARING OR SLIDING BEARING AS A GENERATOR

(71) Applicant: Aesculap AG, Tuttlingen (DE)

(72) Inventors: André Buerk, Villingen-Schwenningen (DE); Frederick Lenzenhuber, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 360 days.

(21) Appl. No.: 18/016,382

(22) PCT Filed: Jul. 23, 2021

(86) PCT No.: PCT/EP2021/070714
§ 371 (c)(1),
(2) Date: Jan. 16, 2023

(87) PCT Pub. No.: WO2022/018273
PCT Pub. Date: Jan. 27, 2022

(65) Prior Publication Data
US 2023/0270449 A1     Aug. 31, 2023

(30) Foreign Application Priority Data
Jul. 23, 2020   (DE) .................... 10 2020 119 427.7

(51) Int. Cl.
*A61B 17/16*     (2006.01)
*A61B 90/98*     (2016.01)
(Continued)

(52) U.S. Cl.
CPC ...... *A61B 17/1628* (2013.01); *A61B 17/1633* (2013.01); *A61B 90/98* (2016.02);
(Continued)

(58) Field of Classification Search
CPC ............. A61B 17/162; A61B 17/1622; A61B 17/1628; A61B 17/1633; A61B 17/32002;
(Continued)

(56) References Cited

U.S. PATENT DOCUMENTS 8,845,197 B2    9/2014   Hasenzahl
9,175,723 B2    11/2015  Blust
(Continued)

FOREIGN PATENT DOCUMENTS

DE    202007010974 U1    10/2007
DE    102007012586       3/2008
(Continued)

OTHER PUBLICATIONS

Search Report received in German Application No. 10 2020 119 427.7 dated Mar. 25, 2021, with translation, 15 pages.
(Continued)

*Primary Examiner* — Samuel S Hanna
(74) *Attorney, Agent, or Firm* — Christopher A. Rothe; CM Law

(57) ABSTRACT

A medical, motor-operated or hand-operated or operable instrument includes a number of bearings for supporting a shaft for applying torque to a tool, of which bearings at least two selected or selectable bearings form a bearing pair. A distance sleeve axially spaces apart the bearings of the bearing pair. The instrument includes a component located at least partly radially inside the distance sleeve. The component is or can be rotationally coupled to at least one of the two bearings to rotate together with a rotating part of the at least one of the two bearings, or to form a rotating part of the at least one of the two bearings. At least one permanent magnet is fastened or formed on or in the component. A coil is arranged on or in the distance sleeve.

18 Claims, 9 Drawing Sheets

(51) Int. Cl.
*F16C 19/54* (2006.01)
*H02K 35/02* (2006.01)
*A61B 17/00* (2006.01)
*A61B 90/00* (2016.01)

(52) U.S. Cl.
CPC ............ *F16C 19/54* (2013.01); *H02K 35/02* (2013.01); *A61B 2017/00415* (2013.01); *A61B 2017/1602* (2013.01); *A61B 2090/066* (2016.02)

(58) Field of Classification Search
CPC ...... A61B 17/8875; A61B 2017/00415; A61B 2017/1602; F16C 19/54
See application file for complete search history.

(56) References Cited

U.S. PATENT DOCUMENTS

| | | | |
|---|---|---|---|
| 9,537,376 B2 | 1/2017 | Duesing et al. | |
| 2008/0226409 A1* | 9/2008 | Hasenzahl | G01L 1/2231 409/188 |
| 2010/0248177 A1 | 9/2010 | Mangelberger et al. | |

FOREIGN PATENT DOCUMENTS

| | | |
|---|---|---|
| DE | 102011050193 A1 | 11/2012 |
| EP | 2704295 A1 | 3/2014 |
| EP | 3406205 A1 | 11/2018 |
| JP | 7317763 A | 12/1995 |
| JP | 2011045156 A | 3/2011 |
| JP | 2012521185 A | 9/2012 |
| JP | 2020054112 A | 4/2020 |
| KR | 20100002486 U | 3/2010 |
| RU | 2012251 C1 | 5/1994 |

OTHER PUBLICATIONS

Search Report received in International Application No. PCT/EP2021/07074 dated Nov. 5, 2021, with translation, 5 pages.
Written Opinion received in International Application No. PCT/EP2021/070714 dated Nov. 5, 2021, with translation, 9 pages.
Notice of Allowance received in Application No. 2023-504371 dated May 7, 2025, with translation, 2 pages.
Office Action received in Chinese Application No. 202180059020.4 dated Jun. 10, 2025, with translation, 11 pages.

* cited by examiner

MEDICAL INSTRUMENT HAVING A BALL BEARING OR SLIDING BEARING AS A GENERATOR

CROSS-REFERENCE TO RELATED APPLICATIONS

This application is the United States national stage entry of International Application No. PCT/EP2021/070714, filed Jul. 23, 2021, and claims priority to German Application No. 10 2020 119 427.7, filed Jul. 23, 2020. The contents of International Application No. PCT/EP2021/070714 and German Application No. 10 2020 119 427.7 are incorporated by reference herein in their entireties.

FIELD

The disclosure relates to a preferably motor-operated or manually-operated medical instrument for preferably rotationally operating a surgical tool optionally received therein, having at least one bearing or bearing unit, preferably of the ball bearing or sliding bearing type having a current generator function.

BACKGROUND

Medical instruments, in particular surgical motor systems, i.e. surgical instruments which are manually operated or have a motor, such as milling, drilling or screwing handpieces, are increasingly equipped with new functions which require transmitting, forwarding, or transferring of electrical signals. Such new functions may be, for example:
- a temperature at a tip of a tool (drilling or milling tool) is determined via temperature sensors,
- forces/torques during milling or drilling are determined via strain gages, or
- a tool type inserted in the medical instrument (drilling/milling handpiece) is identified via sensors or antennas, for example RFID or respectively NFC readout antennas.
- Vibration sensors or inclination sensors and sensors of various types with different functions may also be provided.

These new functions have in common that they require an electrical connection to a control device for transmitting, forwarding or transferring of data.

Up to now, such an electrical connection has been realized, for example, by attaching or inserting signal lines in the milling handpiece itself. In this case, electrical signals are transmitted via individual, insulated signal strands which run in a separate channel through the shaft of the medical instrument (drilling/milling handpiece) and extend to a tip/distal end of the medical instrument (drilling/milling handpiece). However, due to the compact construction and limited installation space of surgical/medical instruments such as drilling or milling handpieces, inserting or incorporating conventional signal lines into the instrument means that an outer diameter of the instrument, in particular of an instrument shaft that optionally extends the instrument in the distal direction (away from the user/applicant), has to be enlarged, since an additional channel for the insulated signal strands becomes necessary.

However, from the user's point of view, this lack of integration of the signal strands into the existing structure of the medical instruments is not desirable and is to be judged as negative, as it worsens the user's/surgeon's visual access to a surgical site in the patient and the medical instrument (handpiece) loses its suitability in particular for narrow surgical accesses. Furthermore, the existing construction is characterized by difficult installation, difficult connection options, and complicated connection of several signal generators when used as a bus.

The prior art also always has the disadvantage that a power supply for the above-mentioned assemblies or sensors has to be provided in the form of lines through the medical instrument (handpiece with instrument shaft if required) to the assemblies. An electrical connection to a higher-level power supply in the overall system or in a corresponding control device is always provided for this purpose.

There may therefore be a need to provide concepts for at least partially autonomous power supply by the medical instrument, in particular the handpiece, itself.

A concrete example of the current prior art is DE 10 2007 012 586 B3 with a dental processing machine.

SUMMARY

Accordingly, it is the object of the present disclosure to avoid or at least reduce the disadvantages of the prior art. In particular, electrical energy is to be harvested/recovered during use of the medical instrument (energy harvesting).

Accordingly, the basic idea of the present disclosure consists substantially in configuring at least one bearing/bearing unit/bearing device, preferably of the ball bearing or sliding bearing type, with a current generator function in such a way that, during manual or motor operation of the medical instrument, mechanical energy is converted/recovered at the bearing/bearing unit/bearing device into electrical energy which can be used for at least partially supplying, in particular, the instrument's own sensor system.

It has been found that, in particular in the case of medical instruments of the hand instrument type, preferably for minimally invasive procedures, an instrument effector (forceps, scissors, tweezers, cutting tool, etc.) is coupled to a hand section or gripping section via a comparatively elongated instrument shaft, wherein a sensor system is provided on or near the effector, via which certain measured variables have to be tapped. Such a sensor system has to be supplied with electrical energy via conductor cables, which have to be routed from the gripping section over/through the instrument shaft to the effector.

If, on the other hand, as provided in the present invention, the at least one bearing/bearing unit/bearing device is used as a current generator, in particular within the instrument shaft, the cable routing distance can be significantly reduced compared to the prior art.

In terms of construction, the preceding basic idea can be implemented, inter alia, for example, in the case of a ball bearing, in that the (ball) cage holding/bearing the balls is equipped/configured with at least one or more circumferentially spaced permanent magnets, and a sleeve (bearing ring or the instrument shaft itself and stationary with respect to the cage) surrounding (at least in sections) the (ball) cage is configured/provided as/with at least one coil. The sleeve may be a separate sleeve (bearing ring) associated with (integrated into) the bearing/bearing unit/bearing device and surrounding at least the cage radially on the outside, or a housing portion of the medical instrument supporting the bearing/bearing unit/bearing device (radially on the outside), or an instrument (elongation) shaft extending the medical instrument axially in the distal direction (away from the user), which may preferably be optionally coupled (available in different lengths) to the instrument (handpiece/handle) or is configured integrally therewith.

In the case of a sliding bearing, for example, it is possible to configure a radially outer bearing sleeve (corresponding to the above-mentioned sleeve) in axial sections with at least one coil and to provide a receptacle sleeve, which is axially rotatably supported in the bearing bushing in a sliding manner, for example for receiving a tool shaft or a drive rod (corresponds to the above-mentioned cage) with at least one or more circumferentially spaced permanent magnets.

In the specific case of a ball bearing/ball bearing unit, it is advantageous to couple two axially spaced ball bearings, each with an inner and an outer ring, via a common ball cage and to provide a distance sleeve at least axially between the two outer rings of the axially spaced ball bearings, which surrounds at least the ball cage axially between the two outer rings, thus forming the aforementioned sleeve, and thus axially spacing the outer rings. A bearing unit constructed in this way is preferably inserted/insertable in the instrument shaft, which optionally extends a medical instrument (handpiece) axially (distally), for receiving, for example, a torque transmission rod (gear rod) or a tool shaft.

In more abstract terms, a bearing component (ball cage) is provided which is inserted or insertable into a bearing sleeve (instrument elongation shaft/instrument housing) provided for a medical instrument (instrument/handpiece). The component (ball cage) has at least one cylindrical portion. The cylindrical portion has a magnetization. This may be in the form of a complete magnetization or a magnet arrangement in the form of one or more individual permanent magnets, i.e. permanent magnets. The magnetization is provided or configured to be co-rotated during operation of the medical instrument, in the direction of rotation or reverse to the direction of rotation of a motor of the medical instrument. Furthermore, the magnetization is provided or configured, i.e. based on the co-rotation, to induce a current in a coil provided in the bearing sleeve (instrument elongation shaft/instrument housing).

Due to the magnetization in the component (ball cage), which is inserted in the medical instrument (instrument/handpiece) during use, and in response to the component rotation caused by the motor rotation, the magnetic field changes, which effectively induces a current in the bearing sleeve (instrument elongation shaft/instrument housing) by suitable application of a coil. This makes it possible to achieve an at least partially autonomous power supply for devices, sensors, etc. connected to the coil.

The component (ball cage) can be understood abstractly herein. On the one hand, it may already be inserted in the bearing sleeve (instrument elongation shaft/instrument housing), on the other hand, it will be inserted for use. In the inserted state, the component (ball cage) may be mounted in the bearing sleeve (instrument elongation shaft/instrument housing) in such a way that it co-rotates at least in response to the motor rotation, preferably in the same direction. This may be a direct or indirect transmission. This may depend on the position and attachment of the component (ball cage) in the bearing sleeve (instrument elongation shaft/instrument housing).

The cylindrical portion may either be a part of the component (ball cage) or the entire component (ball cage). The cylindrical portion may be a hollow cylindrical body or a solid cylindrical body. In one example, over 90% of the component (ball bearing) may be the cylindrical portion. In another example, over 50% of the component (ball cage) may be the cylindrical portion.

The component (ball cage) may have one or more permanent magnets. The magnetization may be configured by the one or more permanent magnets. The one or more permanent magnets may be attached to the cylindrical portion. Thus, the one or more permanent magnets provide the magnetization to the component (ball cage).

Respective north and south poles of the one or more permanent magnets may be arranged adjacent to each other in the radial direction of the cylindrical portion. For example, either respective north poles or south poles are located further from a center of the cylindrical portion or outward in the radial direction, respectively. The one or more permanent magnets may each have an extent in the longitudinal direction of the cylindrical portion. The extent in the longitudinal direction of the cylindrical portion may be at least one-quarter, preferably about one-half, of an extent of the cylindrical portion in the longitudinal direction of the cylindrical portion.

An outer jacket or an outer surface of the cylindrical portion of the component (ball cage) may have one or more recesses or depressions. The recess may include at least a part of the one or more permanent magnets. The other part of the one or more permanent magnets may protrude. The one or more permanent magnets may be fixed in the one or more recesses or depressions via adhesive/glue. The adhesive may, for example, be based on silicone, in particular a silicone encapsulant. The silicone encapsulant may also serve to protect the one or more permanent magnets from corrosion. The solvent may be a mixture of esters and aliphatic solvents in the adhesive. Similarly, the one or more permanent magnets may be appropriately fitted into the one or more recesses or depressions. For this purpose, the one or more recesses or depressions may be configured as a fit. Thus, a simple integration of the magnetization can be provided.

In a preferred embodiment, multiple permanent magnets may be disposed on opposite sides of the cylindrical portion. This may correspond to an angular distance along a circumference of the cylindrical portion of 180°. Furthermore, in the case of three permanent magnets, an angular distance of the multiple permanent magnets from each other of about 120° may be provided. For four permanent magnets, an angular distance of the multiple permanent magnets from each other of about 90° may be provided (etc.). These arrangements of the permanent magnets can provide effective induction of current in the coil provided in the bearing sleeve.

In an advantageous embodiment, the component (ball cage) may be a cylindrical pipe or, in axial sections, a solid body. The cylindrical pipe or the solid body preferably has receptacle cavities at its respective end regions for the balls of the two axially spaced ball bearings. It should be noted at this point that needles or cylindrical rollers may also be provided instead of balls.

Further preferably, the two axially spaced ball bearings, each consisting of the inner and outer rings, the balls mounted radially therebetween, the common, single ball cage, and the radially outer sleeve/distance sleeve enclosing the ball cage between the outer rings may be combined to form a single cartridge-like unit which is simply inserted into/placed on, for example, the instrument elongation shaft, the instrument housing, or on a tool shaft.

In yet other words, the object defined above is solved in the generic instrument by providing an instrument elongation shaft for a medical instrument (instrument/handpiece) or for optional mounting on the medical instrument (handpiece). The instrument elongation shaft may be attached to or be part of the medical instrument. The instrument elongation shaft has a meandering or spiral-shaped coil arranged in a planar manner on an inner circumferential side, said coil being configured either directly in/on the shaft or in/on the separate distance sleeve inserted into the shaft. The coil is configured, as explained above, to generate a current during operation of the medical instrument based on a magnetization of a component (ball cage) that is preferably rotated in the direction of rotation of a motor of the medical instrument.

According to one or more embodiments, signal lines or signal paths can be integrated more effectively into the existing structure of medical instruments, such as surgical (motor) instruments (drilling/milling handpieces), without changing the dimensions of the medical instrument or of the component (ball cage) provided in the medical instrument, for example, without increasing the outer diameter of the medical instrument or respectively of the instrument elongation shaft surrounding the ball cage. For example, a new method of construction of a ball/roller bearing and of the instrument elongation shaft is provided, which enables forwarding/transmitting/transferring of electrical signals through the ball/roller bearing and the instrument elongation shaft, as well as between these components, wherein the dimensions of the components (ball/roller bearing and instrument elongation shaft) remain unchanged, so that the outer diameter of the medical instrument is not increased. The medical instrument thus retains its compact construction and the existing installation space is suitably utilized. The rolling bearing, in particular the ball bearing, can be configured for the preferably multidirectional forwarding or transmission of electrical signals and for this purpose may have at least one signal line or signal path integrated in the ball/rolling bearing.

As indicated above, the roller bearing is not limited to a ball bearing, i.e. any other roller bearings such as cylindrical roller bearings, needle roller bearings, tapered roller bearings, spherical roller bearings, toroidal roller bearings, etc. are also to be included herein. However, the ball bearing is the preferred embodiment of a roller bearing in the present context. It is further preferred that the ball bearing is a micro-ball bearing. The roller/ball bearing is preferably configured or suitable or provided for use in the medical instrument, in particular in the surgical instrument/handpiece, in particular in the drilling/milling handpiece, and even more particularly in the instrument elongation shaft.

For example, the signal line or signal path may be integrated in the outer ring of the roller bearing/ball bearing.

Preferably, the roller bearing/ball bearing (in particular the outer ring of the roller bearing/ball bearing) is made of a non-conductive material. Further preferably, the material of the roller bearing/ball bearing (of the outer ring) is a hard material. Ceramics have proven to be particularly suitable.

The signal line is preferably made of a (highly) conductive material, in particular copper, silver or gold.

An advantageous embodiment provides at least one signal line, in particular signal strand, which is inserted into a bore provided in the roller bearing/ball bearing, in particular into the outer ring of the roller bearing/ball bearing, said bore extending over an entire axial length of the roller bearing/ball bearing. Preferably, the signal line or signal strand is axially fixed in the bore.

Accordingly, the roller bearing/ball bearing or the outer ring of the roller bearing/ball bearing preferably has at least one fine bore. For example, the diameter of the bore may be smaller than 0.2 mm. Preferably, the diameter is approximately in the range of 0.1 mm. Microlaser drilling in particular has proven suitable as a manufacturing process for such a fine bore.

Accordingly, the diameter of the signal line or signal strand is preferably smaller than 0.2 mm, further preferably in the range of 0.1 mm.

Axial fixing of the signal line or signal strand in the bore can be achieved, for example, by plastic deformation of the axial ends of the signal line or signal strand. In particular, a press-fit stem has proven to be suitable. Alternatively, the bore may first be metallized (before the signal line or signal strand is inserted) and axial fixation may be achieved via an adhesive bond or a brazing solder connection.

For example, the signal line may protrude/project in the axial direction of the roller bearing/ball bearing (beyond the outer ring), in particular on both sides/axial ends of the roller bearing/ball bearing, so that the signal line is set up for contacting or plug-in connection with another component of the medical instrument, in particular with the distance sleeve as a separate component or as a component of the instrument elongation shaft. Preferably, the signal line protrudes about 0.1 to 0.3 mm beyond the outer ring or, respectively, in order to be able to solder it to the paths inserted on the ceramic.

Preferably, multiple signal lines or signal paths are provided, for example two, three, four, five, six or more. The signal lines or signal paths may basically be distributed as desired over the circumference of the roller bearing/ball bearing/the outer ring. It is also conceivable to use the entire annulus of the roller bearing/ball bearing (of the outer ring). Accordingly, the signal lines can also be distributed evenly over the annulus.

An upper limit for the number of signal lines or signal paths preferably results from the size of the roller bearing/ball bearing. In particular, it has been found that (in particular for the preferred bore diameter or signal line diameter) the ratio of the outer diameter D (in mm) of the ball bearing to the number of bores or signal lines N should be: $D/N>0.1$. Providing a plurality of signal lines or respectively signal paths distributed around the circumference may result in the contact resistance being reduced (keyword: parallel multi-conductor technology).

In one or more embodiments, the distance sleeve and in particular the instrument elongation shaft may be configured for, preferably multidirectional, forwarding or transmission of electrical signals and for this purpose may have at least one signal line or signal path integrated into the distance sleeve and in particular into the instrument elongation shaft.

Further preferably, the distance sleeve and, in particular, the instrument elongation shaft is configured or suitable or provided for use in the medical instrument, in particular in a surgical handpiece, in particular a drilling/milling handpiece.

Preferably, the distance sleeve and possibly also the instrument elongation shaft are made of a non-conductive material. Further preferably, the material of the distance sleeve and possibly also of the instrument elongation shaft is a hard material. Ceramic has proven to be particularly suitable. The signal line or signal path is preferably made of a (highly) conductive material, in particular copper, silver or gold.

The distance sleeve, or in particular the instrument elongation shaft, is preferably arranged to forward or transmit electrical signals in an axial direction between a first axial end and a second axial end of the instrument elongation shaft and/or in a radial direction between an inner jacket surface and an outer jacket surface of the instrument elongation shaft.

For example, an outer jacket surface of the distance sleeve or an inner jacket surface of the instrument elongation shaft has at least one groove/channel which extends over an entire axial length of the distance sleeve or the instrument elongation shaft. Preferably, the signal path or signal line is provided or respectively arranged in the groove/channel. In other words, conductive material is located in the groove/channel. This means that electrical signals can be tapped at the outer jacket surface/in the outer area of the distance sleeve and/or at the inner jacket surface of the instrument elongation shaft, and can also be forwarded or transmitted.

The at least one channel or the at least one groove is preferably configured to be fine or filigree and is produced by grinding or engraving, in particular by laser engraving. The channel or the groove is preferably metallized and coated with the highly conductive material to configure the signal line or signal path.

In one example, the signal path or signal line is offset inwards with respect to the outer jacket surface of the distance sleeve and/or with respect to the inner jacket surface of the instrument elongation shaft, so that the signal path or signal line is provided only in a lower/inner region of the groove. In other words, the signal path or signal line is preferably completely countersunk in the groove/the channel so that the (outer/inner) jacket surface of the distance sleeve or of the instrument elongation shaft is spaced from the signal path or signal line in the radial direction of the distance sleeve/of the instrument elongation shaft. Thus, the signal line is preferably not flush with the outer or inner jacket surface, but is located further inside. In particular, if more than one signal path or signal line is provided, this ensures that the individual signal paths or signal lines are electrically separated from each other. This is necessary in particular since the instrument elongation shaft of the instrument (drilling/milling handpiece), in which the distance sleeve is preferably to be used and against which the distance sleeve rests directly, may also be made of metal.

It is practical if an insulator is arranged above the signal path or signal line. In other words, the aforementioned electrical separation of the signal paths or signal lines from each other can be improved if an insulator is additionally provided. The insulator may, for example, be an insert, in particular made of silicone. Alternatively, the insulator may also be implemented via an adhesive layer, for example. The additional insulation makes the medical instrument, in particular the drilling/milling handpiece into/onto which the distance sleeve, in particular the instrument elongation shaft, is to be attached/inserted, less sensitive to penetrating conductive liquids (e.g. a saline solution).

In one or more examples, an inner jacket surface of the distance sleeve may have at least one signal path or signal line. If signal lines or signal paths are additionally or alternatively provided on the inner jacket surface of the distance sleeve, electrical signals can be tapped off in the inner area as well as forwarded or transmitted. For example, metallized paths (at least one metallized path) may be provided on the inner surface.

In a further example, a signal path or signal line provided on an inner jacket surface of the distance sleeve may be connected in an electrically conducting manner to a signal path or signal line provided on an outer jacket surface of the distance sleeve. For example, the distance sleeve may have fine bores (micro-bores) which extend in the radial direction of the distance sleeve and via which a signal line or signal path on the inner jacket surface is electrically connectable/connected to a signal line or signal path on the outer jacket surface (for example via conductive material in the bore). In other words, the bore (microbore) preferably runs between the groove/channel on the outer jacket surface and the signal line or signal path on the inner jacket surface.

In other words, as in printed circuit board technology, vias are created which can also function as lands. This means that wired components may also be integrated into the system if SMD components are not available.

A signal path or signal line may basically be inserted into the distance sleeve at different depths. This allows a very thin-walled distance sleeve to be realized, at least in sections. Furthermore, a plurality of signal paths or signal lines can be provided, which are inserted into the distance sleeve at different depths. This applies both to signal paths or signal lines attached to the outer jacket surface and to the inner jacket surface, respectively.

An electrical contact and/or a readout antenna may also be connected to the signal line or signal path in an electrically conducting manner. In particular, the coil described above may be connected in an electrically conducting manner to the signal line or signal path. This applies both to signal lines or signal paths on the inner jacket surface (of the distance sleeve) and to signal lines or signal paths on the outer jacket surface of the distance sleeve. If a plurality of signal lines or signal paths are provided, a signal path or signal line may be interrupted at one side (for example, the inner side) and continued at the other side (for example, the outer side). This can be achieved by a conductive connection in a radially extending bore.

For example, an electrical contact/electrical contact surface for a sensor or for another (electronic) component may be applied to the inner jacket surface of the distance sleeve and is preferably connected in an electrically conducting manner to a signal line or signal path applied to the inner jacket surface. In this respect, the electrical contact/an electrical contact surface or multiple electrical contacts/electrical contact surfaces for the coil may be applied to the inner jacket surface of the distance sleeve is/are preferably connected in an electrically conducting manner to a signal line or signal path applied to the inner jacket surface. In this respect, the electrical contacts/electrical contact surfaces may also be omitted if the coil is inserted together with the signal line(s) or signal path(s) in the distance sleeve.

It is furthermore conceivable that a readout antenna is provided on the inner jacket surface, which is preferably connected in an electrically conducting manner to a signal line or signal path applied to the inner jacket surface. This may also be realized in such a way that the signal line or signal path is arranged or configured on the inner jacket surface in such a way that the signal line or signal path itself forms the readout antenna. Such a readout antenna can be used, for example, for reading or writing on an RFID chip.

In addition, the outer jacket surface of the distance sleeve and in particular of the instrument elongation shaft may also have an electrical contact/an electrical contact surface for a sensor or for another component, which is preferably connected in an electrically conducting manner to a signal line or signal path applied to the outer jacket surface. The externally applied electrical contacts or contact surfaces may be used to connect externally applied sensors, (electronic) components, (read-out) antennas, etc. They may also be provided for connecting components integrated in the handpiece or for supplying power via the handpiece.

Furthermore, it is advantageous if the distance sleeve and/or the instrument elongation shaft consists of a plurality of (at least two, preferably three or more) distance sleeves placed one inside the other. In other words, multiple distance sleeves/shafts are preferably to be arranged in multiple layers. This allows even more functions to be integrated into the distance sleeve/shaft, and the installation space is maximally used.

Preferably, in the medical instrument, the roller/ball bearing and the distance sleeve are arranged axially adjacent to each other, such that the at least one signal line or signal path of the roller bearing is linked/connected to the at least one signal line or signal path of the distance sleeve via a plug-in connection, so that the medical instrument is configured for (multi-directional) signal forwarding or signal transmission between the ball/roller bearing and the distance sleeve.

Thus, in the medical instrument/in the drilling/milling handpiece, electrical signals can be forwarded and transmitted from a distal region to a proximal region of the medical instrument and vice versa, i.e., in the axial direction of the medical instrument, via the ball/roller bearing or its outer ring(s) and the distance sleeve or via a plurality of ball/roller bearings and a plurality of distance sleeves.

By providing the ball/roller bearing with integrated signal lines and distance sleeves with integrated signal lines, and by connecting the signal lines of the roller bearing to the signal lines of the distance sleeves via a plug-in connection, electrical signals can be transmitted through these components as well as between these components.

The roller bearing preferably allows signal transmission from distal (away from the user) to proximal (towards the user) and vice versa, i.e. in the axial direction of the medical instrument or roller bearing, respectively.

The distance sleeve and/or the instrument elongation shaft preferably allows signal transmission both from distal to proximal and vice versa, i.e. in the axial direction of the medical instrument or distance sleeve, and from inside to outside and vice versa, i.e. in the radial direction of the medical instrument or distance sleeve.

Overall, multidirectional signal forwarding/transmission is provided in the medical instrument/handpiece (milling handpiece), which is made possible by the roller bearing and the distance sleeves with integrated signal lines/paths.

New/extended functions/functionalities are realized in the medical instrument according to the present disclosure without increasing the outer diameter or the outer dimensions of the instrument elongation shaft of the surgical instrument/handpiece. Thus, miniaturized signal transmission, easy assembly, extended/new placement possibilities of signal generators, antennas or sensors, realization of complex circuits on very small installation space, and suitable integration into existing components can be provided.

In other words, the invention relates to one or more of the following advantages/properties:
an autonomous power supply by the handpiece itself,
a decoupled power supply from the control device or the next control components following in the system,
an integration into the existing structure of today's drilling/milling handpieces,
facilitated assembly,
easier connection,
no complicated connection of multiple signal generators when used as a bus system as well as
no additional channel for insulated strands, which would increase the outer diameter of the shaft.

In still other words, the invention relates to the use of ball bearings according to the aforementioned construction as power generators for generating/harvesting energy in order to operate electronic components such as sensors in devices autonomously and thus uncoupled from the control device or the next control component following in the system, preferably without complex supply of energy through the entire device.

In addition, the distance sleeves (and/or instrument elongation shafts) can accommodate electronic lines in order to house electronic components as well. In this variant, the distance sleeve may take on a further supporting role. It may serve as a coil to generate/harvest energy. For this purpose, the ball bearings may be configured with a cage. The ball cage may also have a construction that is very long. For example, north/south permanent magnets are applied to a central area of the ball cage in order to generate/harvest energy in combination with the coil in the distance sleeve. This may be configured over the entire length as well as partially, in a single layer or in multiple layers. For example, the coil is configured in a meandering shape. However, it is also possible to use a spiral coil. Furthermore, it is also conceivable to configure the coil in multiple layers in order to be able to achieve a higher energy input into the coil.

By inserting the tools into the instrument elongation shaft and starting the motor, the entire internal assembly, for example the component (ball cage) described here, can be set in (rotary) motion. This generates electrical energy via the coil and can be used for electronic circuits. Depending on the length of the instrument elongation shaft, this assembly may also be inserted several times into the instrument elongation shaft and thus multiple coils may be used for generating/harvesting. Any rotating motors, including manual drives, may be suitable for generating/harvesting.

One or more embodiments may involve implementation as an autonomous assembly. Thus, for example, attachments may be provided which can be decoupled from the actual drive. If an identical or similar construction is chosen, these attachments can also be autonomously supplied with energy and can thus operate electronic components. This is a further step toward the digitalization of products. This idea can be scaled to any non-powering or respectively non-powered attachments that include a rotary motion.

In other words, in one variant permanent magnets may be provided on a tool or on the fixedly installed driveshaft behind it. This means that the ball cage can be dispensed with as a carrier for the permanent magnets. Instead, the tool would carry the permanent magnets. Another advantage of this solution is that, compared with the ball cage, higher rotational speeds can be achieved with the tool itself and the energy input is therefore also higher. In order to avoid having to apply permanent magnets to the tools, magnetization of the tools may also be effective. This can be advantageous for low-energy applications.

In other words, in one variant, instead of the common ball cage, a common inner ring may be configured, which in turn is equipped with permanent magnets for harvesting. This also has the advantage of higher speed and the additional advantage that not every tool has to be equipped with a permanent magnet. In addition, much larger permanent magnets can be applied in this variant in order to generate/harvest even more energy.

Thus, the present invention may have at least one of the following properties: integration of assemblies for harvesting energy in products, autonomous power supply of electronic components, integration of sensors and power supply, digitalization of devices and coupling of generation/harvesting with energy modules and data memory modules as well as communication modules, such as Bluetooth Low Energy, BLE, wireless local area network, WLAN, etc., thus there are no limits to the usability and this is ideal for true wireless applications (sensors in the distal area of handpieces and attachments).

The following advantages can be achieved, at least in part:
complex construction with power supply through instruments can be avoided,
autonomous power supply of electronic components, integration of sensors and power supply of sensors is now possible, independent power supply of attachments, which are operated without electrical connection, digitalization capability of products/instruments, electronic components can be supplied autonomously by the control device or the next control components following in the system and can thus be operated wirelessly.

It is clear to the person skilled in the art that the explanations presented herein may be/are implemented using hardware circuits, software means, or a combination thereof. The software means may be related to programmed microprocessors or a general computer, an ASIC (Application Specific Integrated Circuit) and/or DSPs (Digital Signal Processors).

For example, the medical instrument may be implemented in part as a computer, a logic circuit, a Field Progammable Gate Array (FPGA), a processor including, for example, a microprocessor, a microcontroller (µC), or a vector processor having a core or Central Processing Unit (CPU), a Floating Point Unit (FPU), a Numeric Processing Unit (NPU), an Arithmetic Logical Unit (ALU), a coprocessor (additional microprocessor to support a main processor (CPU)), a General Purpose Computation on Graphics Processing Unit (GPGPU), a parallel computer (for simultaneous execution, inter alia on several main processors and/or graphics processors, of computational operations) or a DSP.

BRIEF DESCRIPTION OF THE DRAWINGS

The disclosure is explained hereinafter with the aid of drawings. The following is shown.

DETAILED DESCRIPTION

The figures are merely schematic nature and are intended solely for the purpose of understanding the invention. Identical elements are provided with the same reference signs. The features of the individual embodiments can be interchanged.

In addition, spatially relative terms, such as 'located below', 'below', 'lower', 'located above', 'upper', 'on the left', 'left', 'on the right', 'right' and the like, may be used herein to simply describe the relationship of an element or structure to one or more other elements or structures shown in the figures. The spatially relative terms are intended to include other orientations of the structural element in use or operation in addition to the orientation shown in the figures. The structural element may be oriented differently (rotated by 90 degrees or in a different orientation), and the spatially relative descriptors used herein may likewise be interpreted accordingly.

The medical instrument, the instrument elongation shaft, the distance sleeve and the ball bearing together with the component/ball cages connecting them are now described with reference to several preferred configuration examples.

Figure 1:
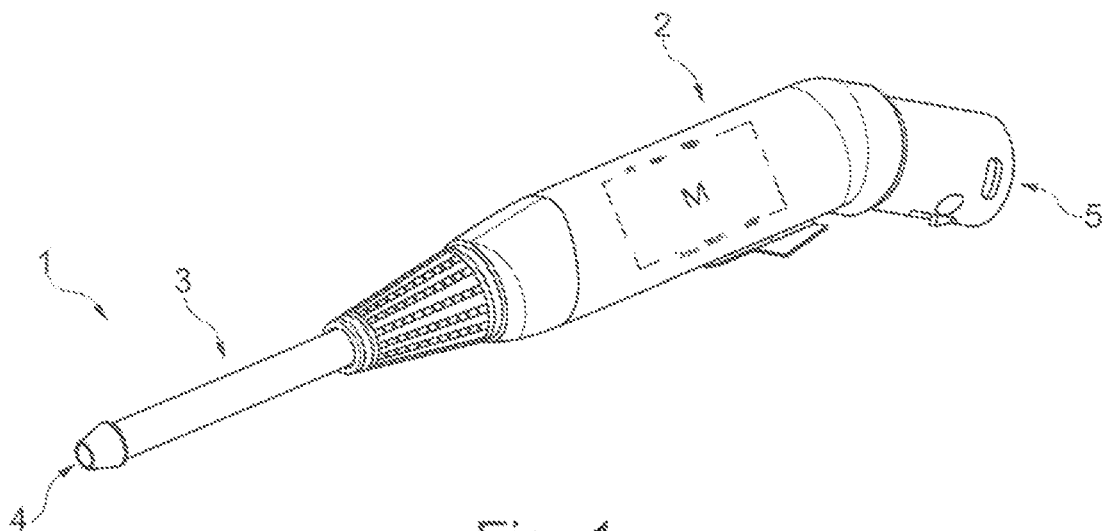
FIG. 1 shows a schematic representation of a medical instrument/handpiece with instrument elongation shaft.

FIG. 1 shows a schematic representation of a medical instrument 1 with a hand/gripping section 2 and an instrument elongation shaft (or simply instrument shaft) 3 having a distal end. The instrument elongation shaft 3 has a receptacle 4 at the distal end for a tool 17 (drilling/milling tool), which is coupled via a driveshaft/rod not further shown within the instrument elongation shaft 3 to a drive (motor) not further shown within the handpiece 2 to transmit torque from the drive to the tool 17. This construction is part of the general prior art of the applicant and therefore requires no further explanation here.

Furthermore, the handpiece 2 has a proximal terminal for a power supply, for example a power connection 5, via which the drive (motor) inside the handpiece 2 can be supplied with energy. It should be noted at this point that the proximal terminal shown may also be an interface for a battery.

As can also be seen from FIG. 1, there is a manually-operable coupling 2a between the handpiece 2 and the instrument elongation shaft 3 for optional mechanical and, if required, electrical connection of the instrument elongation shaft 3 to the handpiece 2. However, it is also possible that the instrument elongation shaft 3 is a fixed component of the handpiece 2 and therefore cannot be disassembled.

Figure 2:
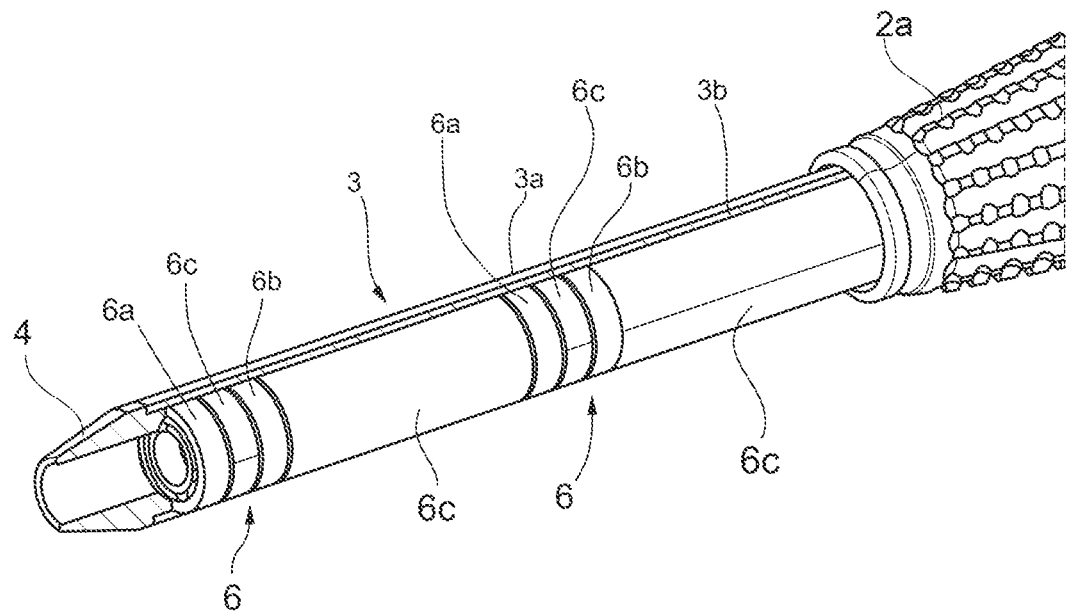
FIG. 2 shows a schematic representation of the instrument elongation shaft.

FIG. 2 shows a schematic, longitudinal, sectionally-opened representation of the instrument elongation shaft 3.

In this configuration example, the instrument elongation shaft 3 has a radial outer jacket 3a of the elongation shaft 3, at the distal end portion of which, the tool receptacle 4 is configured or fixed. On the inner side of the outer jacket 3a of the elongation shaft 3, an (electrical) inner insulation sheath 3b of the elongation shaft 3 is preferably inserted. However, it is also possible for the inner components to be inserted into the instrument elongation shaft 3 without an inner insulation sheath 3b of the elongation shaft 3.

Multiple pairs of ball bearings 6 are arranged along the instrument elongation shaft 3 and are spaced apart from each other in the axial direction of the instrument elongation shaft 3 so that the drive shaft, which is not shown further, or a tool 17 connected to the shaft can be rotatably mounted in the instrument elongation shaft 3 accordingly or a rotational force (torque) can be transmitted from the motor of the medical instrument 1 to the tool 17 via the shaft.

Each pair of ball bearings 6, preferably at least the distally located pair of ball bearings 6, has two selected, axially spaced, individual ball bearings 6a, 6b and a distance sleeve 6c axially between the two selected individual ball bearings 6a, 6b. Each thus defined selected pair of ball bearings 6 of the above concept is thereby axially immovably inserted into the instrument elongation shaft 3, preferably into the inner insulation sheath of the elongation shaft 3b.

Figure 3:
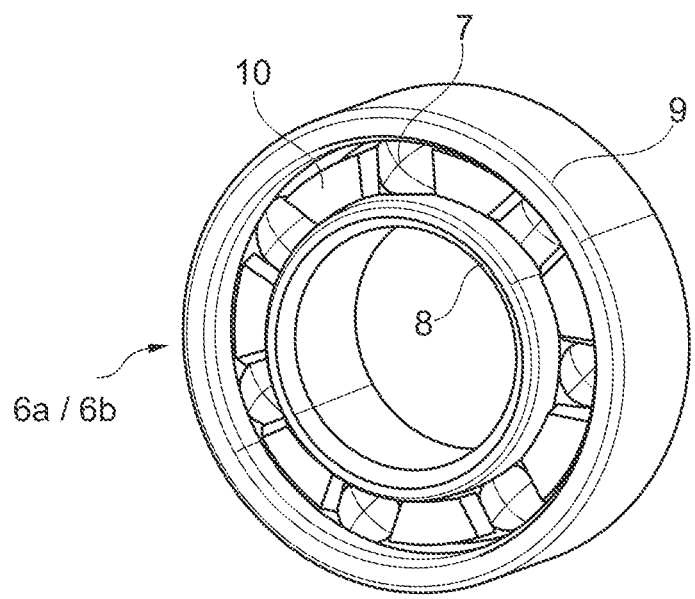
FIG. 3 shows a schematic representation of a ball bearing.

FIG. 3 shows a schematic representation of such an individual ball bearing 6a, 6b. Each individual ball bearing 6a, 6b of the same pair of ball bearings 6 preferably has balls 7 as rolling elements, wherein other rolling element shapes may of course also be provided. The individual ball bearing (hereinafter simply referred to as ball bearing) 6a, 6b further has an inner ring 8 and an outer ring 9 between which the balls 7 are supported. The balls 7 are held at a distance in the circumferential direction by a ball cage 10.

Figure 4:
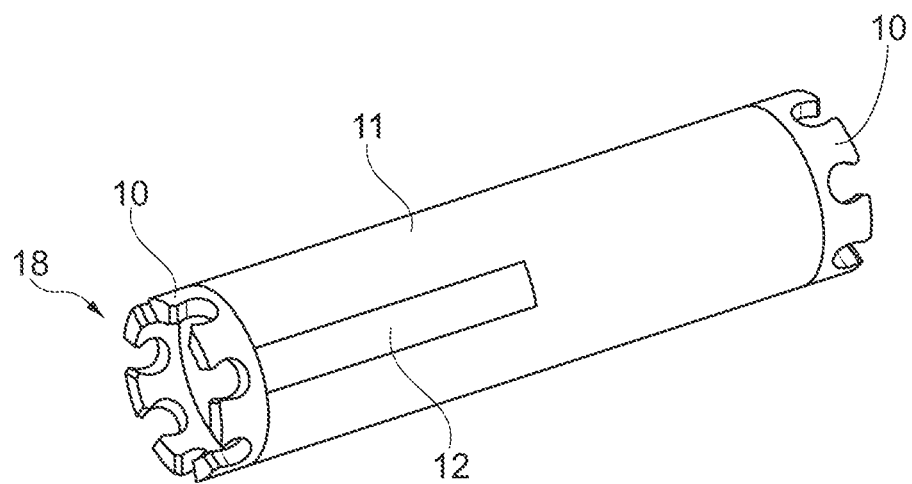
FIG. 4 shows a schematic representation of a component as a pipe/ball cage with permanent magnets according to a first preferred configuration example of the disclosure.

The ball cage 10 of each ball bearing 6a, 6b of a pair of ball bearings 6 is shown schematically in FIG. 4.

Accordingly, each ball cage 10 forms circumferentially spaced, axially extending projections/teeth between which pocket-shaped ball receptacles are formed in which the balls 7 are individually inserted. In this preferred configuration example, the ball cages 10 of the paired ball bearings 6a, 6b are fixedly connected to each other via a cylindrical portion 11 to form a single, common cage component or pipe 18.

The pipe 18 shown in FIG. 4 therefore has at least the cylindrical portion 11, on the axial front sides of which the ball cages 10 of the two axially spaced ball bearings 6a, 6b of the one pair of ball bearings 6 are fixedly arranged. The cylindrical portion 11 additionally has at least one, preferably multiple, circumferentially spaced permanent magnets 12 on its outer circumference near the one ball cage 10. The ball cages 10 may be configured together with the cylindrical portion 11 as a single piece or may be fixedly connected thereto as separate components. Each, preferably strip-shaped, permanent magnet 12 also extends from just the one ball cage 10 in the axial direction approximately up to the axial center of the cylindrical portion 11.

At this point, it should be noted for better understanding that at least the axial dimensioning of the pipe 18 according to FIG. 4 may be unrealistic and serves only for illustration purposes. Rather, in particular the cylindrical portion 11 between two arbitrarily selected ball bearings 6a, 6b coupled to form a pair may in reality also be significantly shorter or longer, as shown in FIG. 2 by the distance sleeves 6c of different lengths. In particular, it should be noted in this context that according to the disclosure, the ball bearing 6b arranged on the distal instrument elongation shaft 3 in FIG. 2 may also be coupled with the ball bearing 6a adjoining it in the proximal direction to form a pair of ball bearings 6. I.e., in accordance with the disclosure, the pair of ball bearings 6 is generally understood to be a pair of axially adjacent ball bearings, so that the pipe 18 and in particular the cylindrical portion 11, as mentioned above, may vary in its axial extension. Thus, the longer distance sleeve 6c in FIG. 2 may also be used for the coil 13.

Figure 5:
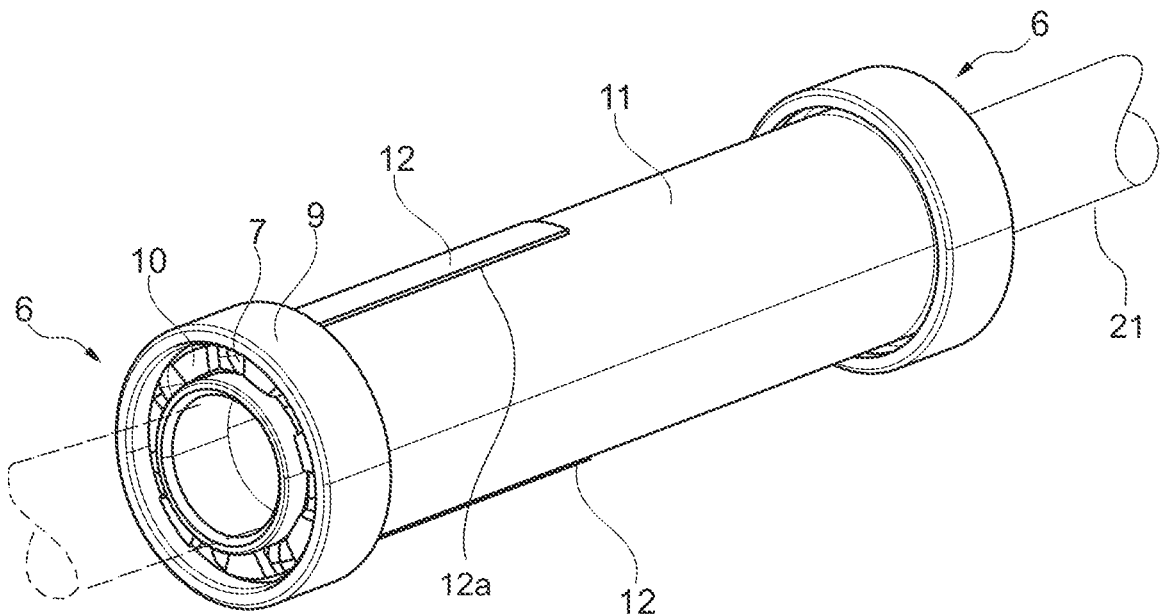
FIG. 5 shows a schematic representation of a component/ball cage with permanent magnets positioned between ball bearings.
Figure 6:
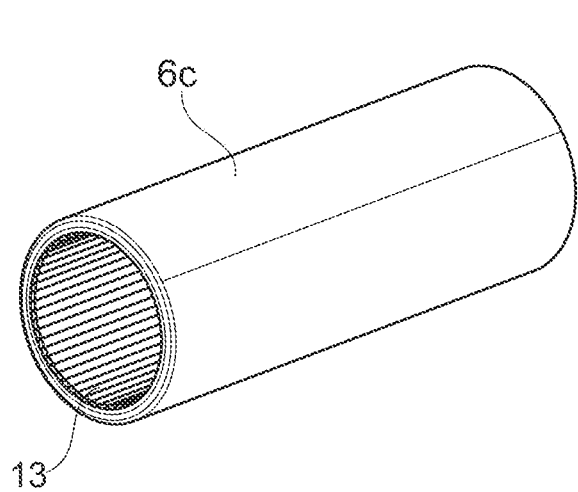
FIG. 6 shows a schematic representation of a part of an instrument elongation shaft with integrated coil.

FIG. 5 shows a schematic representation of the pipe 18 with permanent magnet 12 positioned between the ball bearings 6a, 6b of the one pair of ball bearings 6. Accordingly, the axial projections/teeth of each ball cage 10 engage between the balls 7 of the two ball bearings 6a, 6b so that the ball cages 10 are rotatable together with the balls 7 along the circumference between the inner ring 8 and the outer ring 9. Furthermore, the pipe 18 may be arranged between the ball bearings 6a, 6b of the one pair of ball bearings 6 such that it is not axially displaceable. Finally, it can be seen from FIG. 5 that preferably two permanent magnets 12 are provided, which in this case are positioned diametrically to each other on the cylindrical portion 11 of the pipe 18. The permanent magnets 12 are inserted into a recess 11a on the outer jacket surface of the cylindrical portion 11 (as shown in FIG. 6), such that the permanent magnets 12 project beyond the jacket surface and thus configure a radially projecting step 12a around the permanent magnet 12. However, the permanent magnets 12 may also be flush with the outer jacket surface of the cylindrical portion 11.

Figure 7:
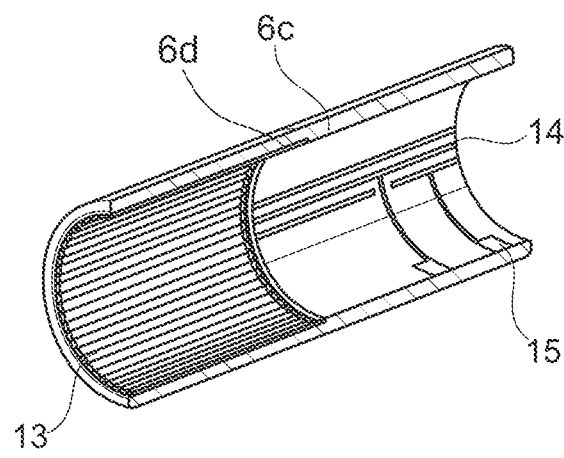
FIG. 7 shows a schematic representation as a longitudinal section of a part of the distance sleeve with integrated coil.

FIGS. 6 and 7 show a schematic representation of a part of the distance sleeve 6c with integrated coil 13.

In this preferred configuration example, the (longitudinally slotted) distance sleeve 6c is configured separately from the instrument elongation shaft 3 and keeps the two ball bearings 6a, 6b at an axial distance from each other. For this purpose, the distance sleeve 6c preferably rests on the mutually facing front sides of the outer rings 9 of the two ball bearings 6a, 6b of the same pair of ball bearings 6 and thus surrounds the cylindrical portion 11 of the pipe 18 radially on the outside (see in particular FIG. 9).

Starting from (only) one front side, the distance sleeve 6c is provided over an axial length to approximately its axial center with a radial hollow-turned part/bulge 6d on its inner jacket surface, into/at which the coil 13 is inserted, which is configured in a meandering or spiral shape. The coil 13 may thus make up at least half of the inner circumference of the distance sleeve 6c. Furthermore, the coil may be arranged along the inner diameter circumference of the instrument elongation shaft 3. The radial bulge 6d is dimensioned in such a way that (as shown in particular in FIG. 9) the possibly radially projecting permanent magnets 12 can be accommodated therein without contact.

Furthermore, a number of signal lines 14 and inner contacts 15 connected thereto are arranged/configured on the radially inner jacket surface of the distance sleeve 6c in an axial section axially adjacent to the coil 13. In particular, the signal lines 14 are arranged largely in the longitudinal direction of the distance sleeve 6c such that they are (electrically) connected to the coil 13 at an axial location. The inner contacts 15 are thereby preferably in (electrical) contact with radially outer, axially extending signal lines 14 of the distance sleeve 6c via radial through-holes/through-lines as well as via radial outer contacts 16 (see in particular also FIG. 12).

Figure 8:
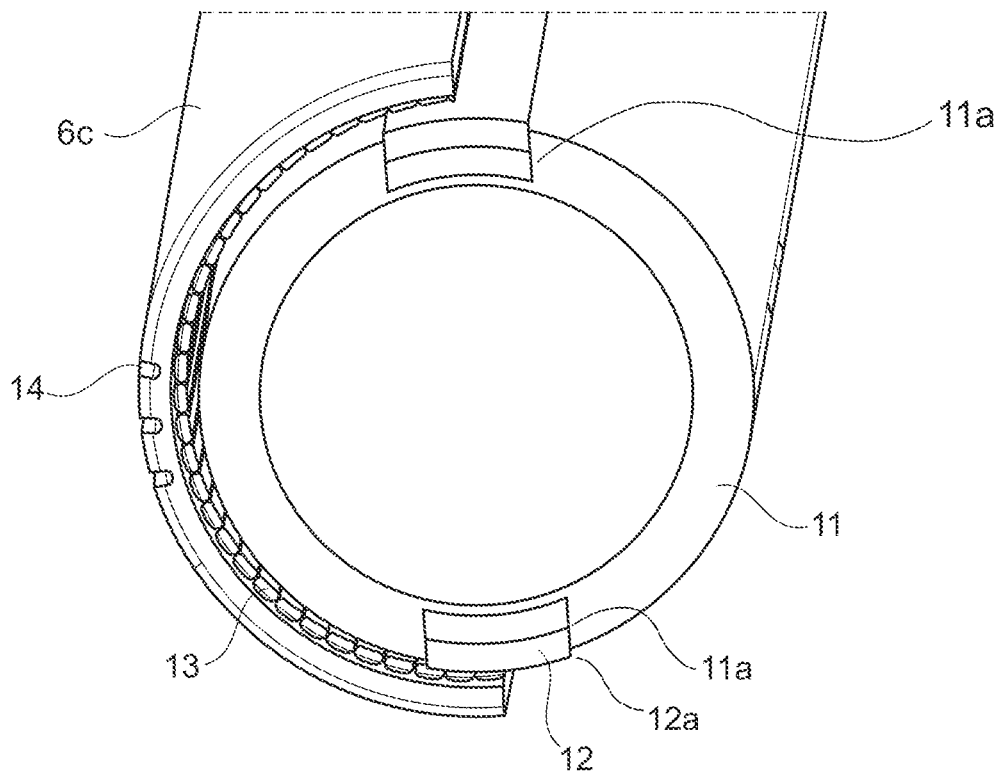
FIG. 8 shows a schematic partial representation of a component (ball cage) arranged in an instrument elongation shaft, in particular a distance sleeve with coil.

FIG. 8 shows a schematic partial view of the pipe 18 arranged in the distance sleeve 6c with coil 13. Here, the cylindrical portion 11 is seen, which has the aforementioned recesses 11a containing the permanent magnets 12, each of which has a north pole and south pole oriented in the radial direction and which are shown by different layers, respectively. The north and south poles of the respective permanent magnets 12 face each other on the cylindrical portion 11 in the radial direction, wherein the corresponding north poles or the corresponding south poles face radially outward. The arrangement of the north and south poles is as follows for two permanent magnets 12:

If north is radially outward for the upper permanent magnet in FIG. 8, then south is radially outward for the lower permanent magnet. On the radial inner side of the distance sleeve 6c, north and south are therefore opposite each other. Thus, the field lines can form according to the principle of a current generator.

On an outer circumference of the distance sleeve 6c, the signal lines 14, which in FIG. 7 are also arranged on an inner side of the distance sleeve 6c in the longitudinal direction, extend axially further, as can be seen in FIG. 8.

Figure 9:
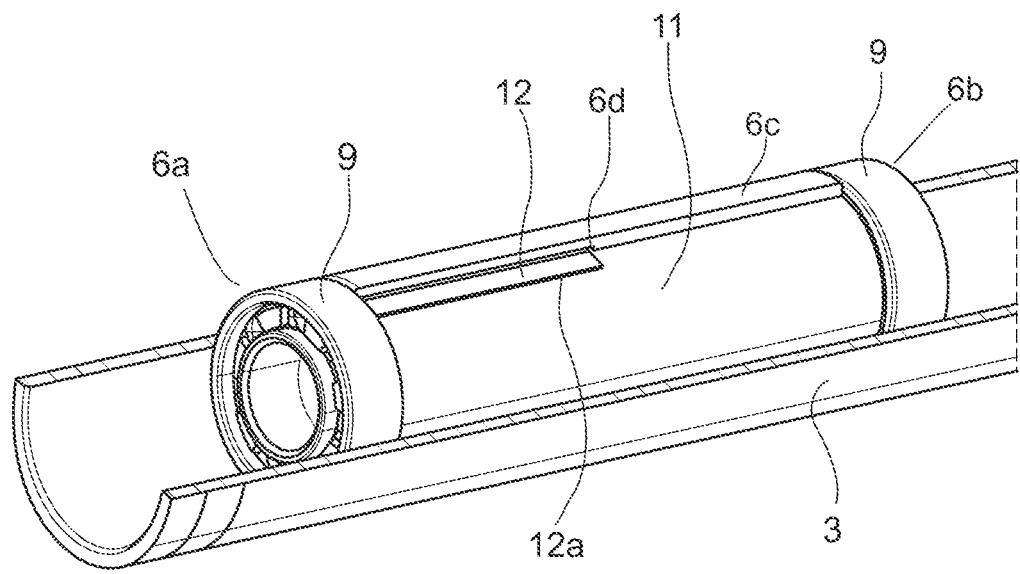
FIG. 9 shows a schematic open representation of a component (ball cage) arranged in a distance sleeve with coil.

FIG. 9 shows a schematic open representation of the pipe 18 as a component (rotor of the generator) arranged in the distance sleeve 6c with coil 13. Accordingly, the selected pair of ball bearings 6 together with pipe 18 is combined to form a type of unit/cartridge which is inserted in a closed manner into the instrument elongation shaft 3. At this point it should be noted that the instrument elongation shaft is only a preferred installation location of the pair of ball bearings, wherein this may also be arranged at other locations, for example within a housing of the handpiece 2.

Figure 10:
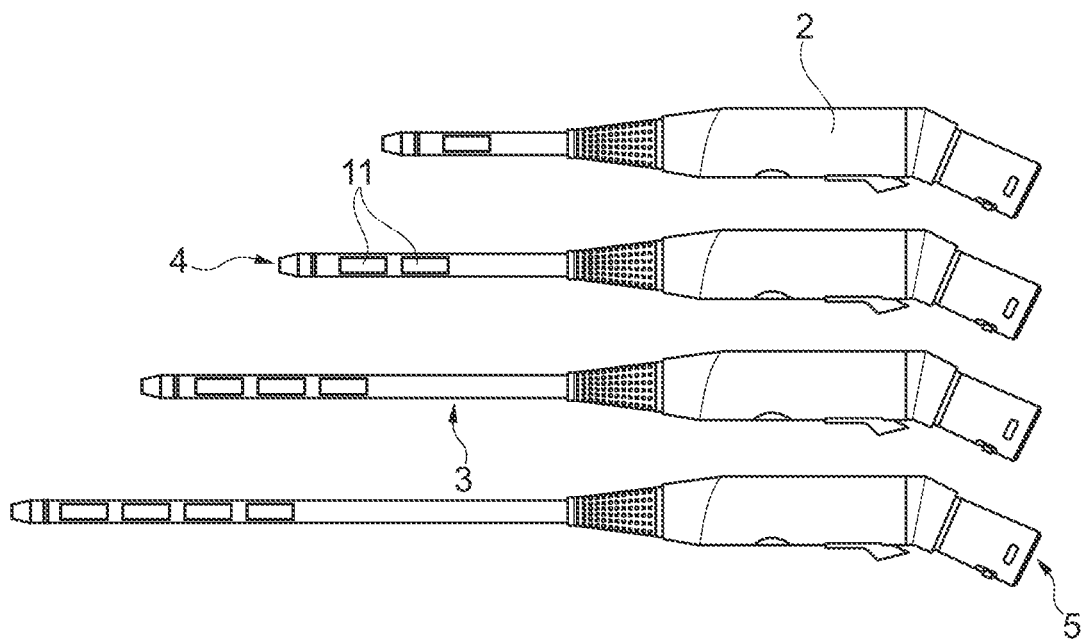
FIG. 10 shows a schematic representation with handpieces and different numbers of distance sleeves (within instrument elongation shafts of different lengths)

Furthermore, instrument elongation shafts 3 of different lengths may be provided. FIG. 10 shows a schematic representation of medical handpieces 2 with instrument elongation shafts 3 of different lengths. Within the different elongation shafts, a different number of longitudinally spaced spacers 6c may also be arranged with different lengths, which radially surround the respective component (ball cage).

Figure 11:
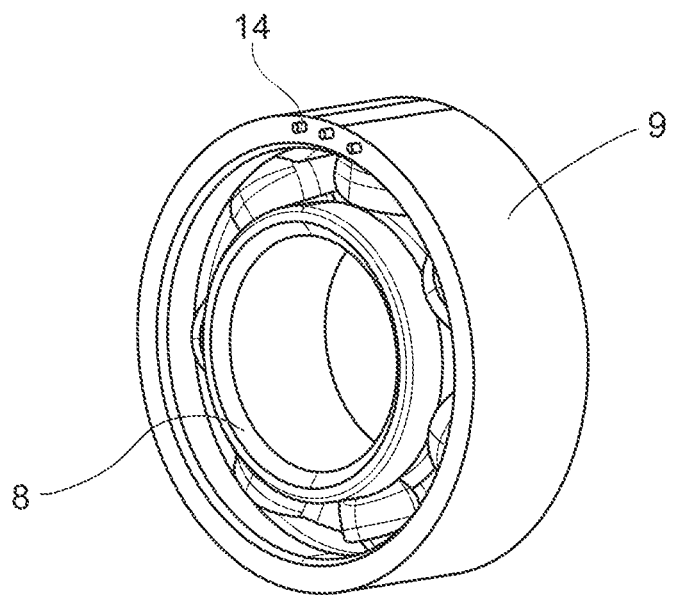
FIG. 11 shows a schematic representation of a ball bearing with signal lines.

FIG. 11 shows a schematic representation of a ball bearing 6a/6b of a selected pair of ball bearings 6 with signal lines 14, as described above, which are inserted into the radially-outer outer ring 9. As can be clearly seen from FIG. 11, the signal lines 14 form axially projecting contact pins at least on one, preferably from both front sides of the radially-outer outer ring 9, said contact pins engaging in corresponding axial bushings in the distance sleeve 6c during assembly of a selected pair of ball bearings 6 and thus establishing an electrical contact closure between the signal lines 14 in the distance sleeve 6c and the signal lines 14 in the radially-outer outer ring 9.

Figure 12:
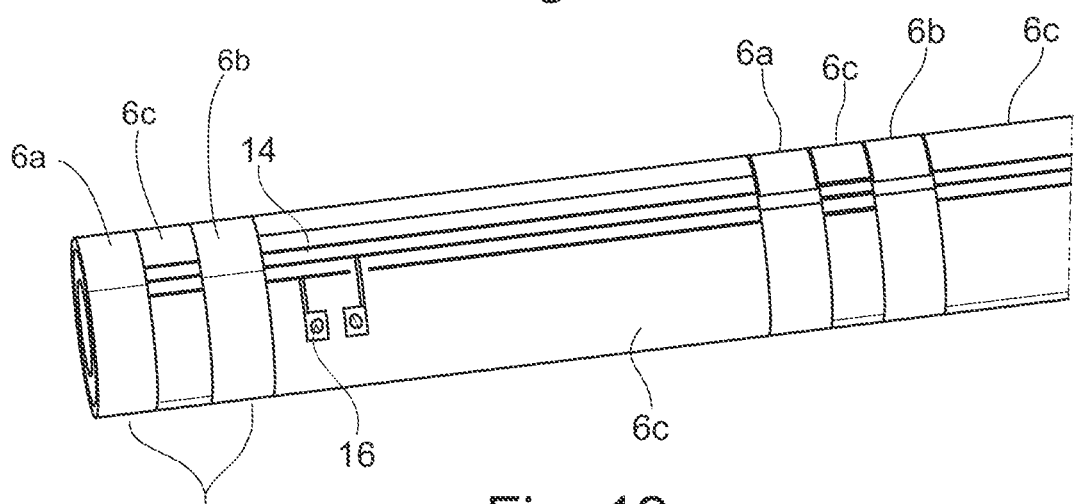
FIG. 12 shows a schematic representation of a distance sleeve with signal lines.

FIG. 12 shows a schematic representation of an instrument elongation shaft 3 with radially outer signal lines 14, as also described above. Accordingly, the signal lines 14 extend from the distal pair of ball bearings 6 into the handpiece 2, wherein the signal lines in the radially-outer outer ring of all ball bearings and the signal lines of all distance sleeves electrically couple according to the above bushing-pin principle. Furthermore, FIG. 12 shows the aforementioned contact points 16 on a selected distance sleeve 6c, which are connected to the radially inner contact points 15 via radial contacts. In this way, the radially inner signal lines of the selected distance sleeve 6c are electrically connected to its radially outer signal lines.

Figure 13:
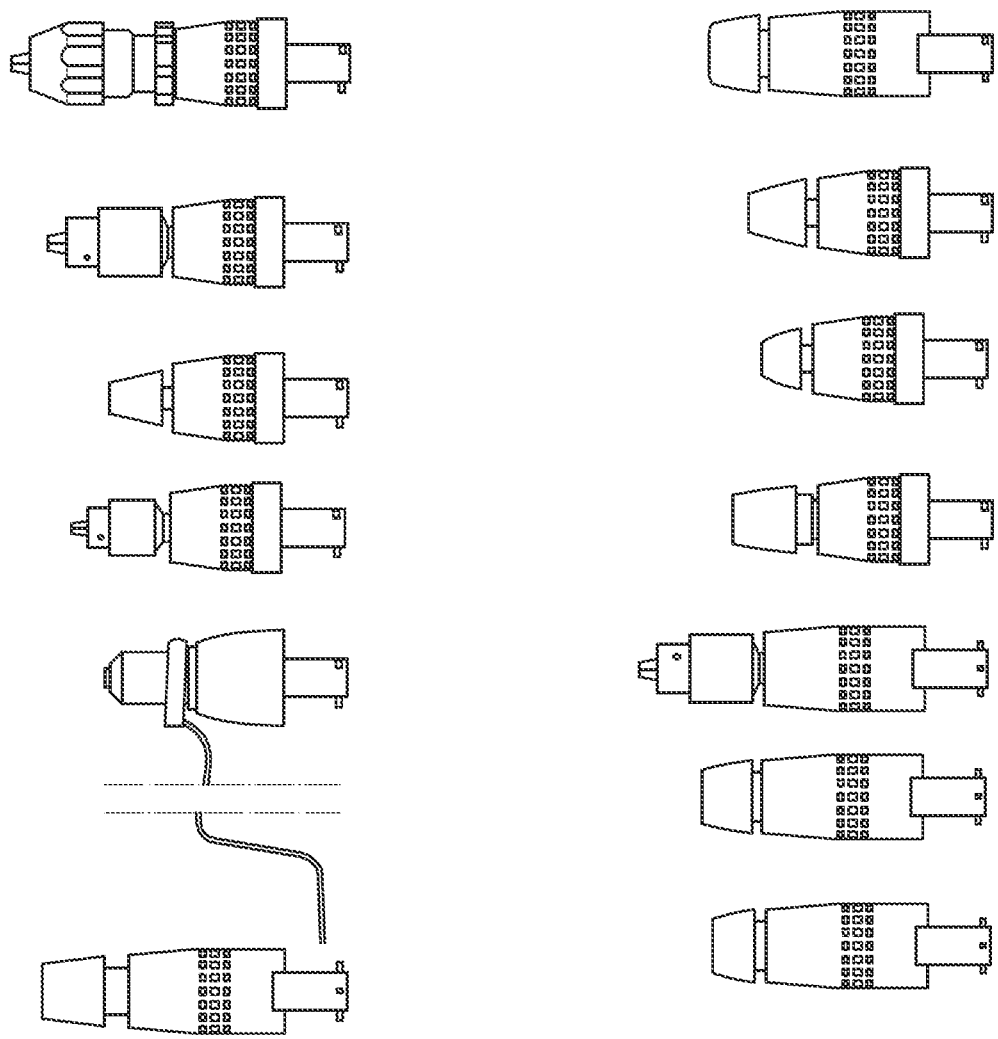
FIG. 13 shows a schematic representation of different attachments as adapters.

Furthermore, FIG. 13 shows a schematic representation of different tools or attachments 17 as adapters. From top to bottom, the left side shows a keyless 3-jaw drill adapter, a 3-jaw drill adapter (0.5-7.4 mm), an AO small drill adapter, a small 3-jaw drill adapter, a crib wire adapter, a Hudson/Zimmer milling adapter. From top to bottom, the right side shows a large AO medullary drill adapter, a small AO drill adapter, a hexagonal drill adapter, a Hudson/Zimmer drill adapter, a 3-jaw milling adapter (0.5-7.4 mm), a large AO milling adapter and a Harris milling adapter.

Figure 14:
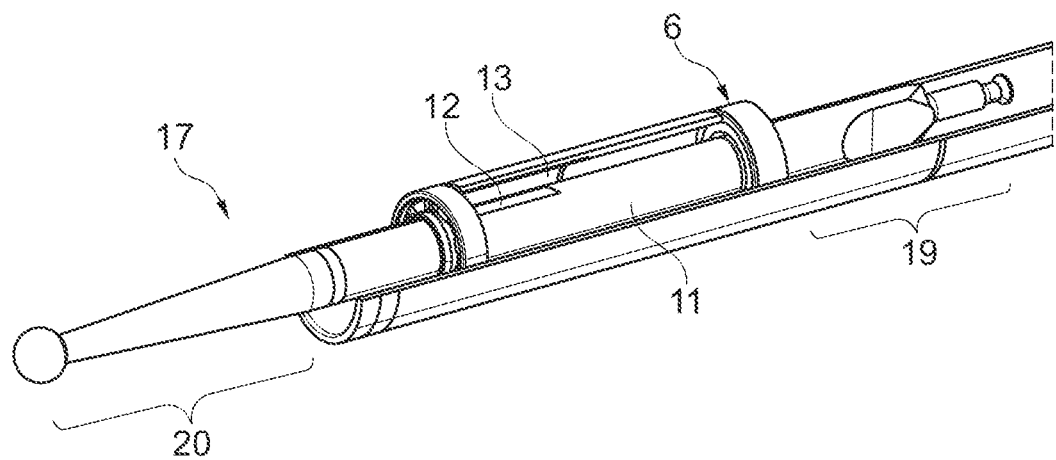
FIG. 14 shows a schematic representation of a component as a tool with permanent magnets according to a second preferred configuration example of the disclosure.

FIG. 14 shows a schematic representation of a medical instrument and in particular of an instrument elongation shaft 3 according to a second preferred configuration example of the disclosure with a component in the form of the tool 17 itself, i.e. that in this case the pipe 18 according to the first preferred configuration example is replaced by the shaft of the tool 17. For this purpose, the tool 17 has a distal effector portion 20, which is connected to a proximal coupling portion 19 of the tool 17 via a cylindrical shaft portion 11 insertable into the elongation shaft 3, via which the tool 17 can be coupled in an axially and rotationally fixed manner to the (not shown in more detail) driveshaft 21 within the instrument elongation shaft 3. The cylindrical portion 11 of the tool 17 has the permanent magnets 12 which are provided for inducing a current into the coil 13 of the at least one distance sleeve 6c shown in half section in FIG. 14, which is provided in the shaft portion immediately proximal to the tool receptacle 4 and radially surrounding the tool shaft. The cylindrical portion 11 of the tool 17 can be arranged between the ball bearings 6a, 6b of the in this case distal pair of ball bearings 6 in such a way that in particular the electrical induction effect described above between the tool 17 and the distance sleeve 6c is utilized for harvesting electrical energy. The cylindrical portion 11 of the tool 17 is seamlessly connected to the coupling portion 19 on one axial side and the effector portion 20 on the other axial side. The permanent magnets 12 inserted in the cylindrical portion 11 of the tool 17 are rotated clockwise or counterclockwise, creating a variable magnetic field during the rotation of the tool 17 that generates a current in the coil 13. This is a simple way to generate/harvest energy. This principle applies to each of the components described herein.

Figure 15:
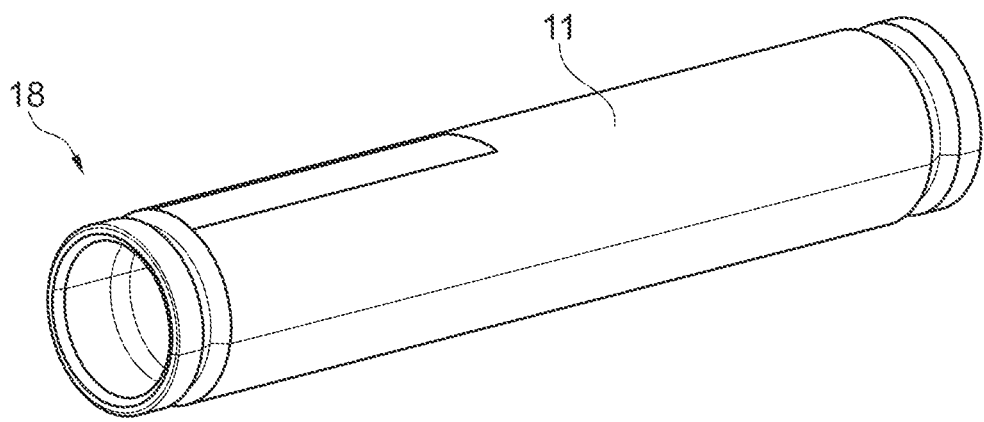
FIG. 15 shows a schematic representation of a component as an inner ring of a ball bearing with permanent magnet according to a third preferred configuration example of the disclosure.

FIG. 15 shows a schematic representation of an inner ring 8 of a pair of ball bearings 6 according to a further preferred configuration example of the disclosure as the component with permanent magnet 12. Here, the inner ring 8 can be firmly connected to the driveshaft within the instrument elongation shaft 3 or the medical instrument 1, or the tool 17 itself. Thus, a torque transmitted via the driveshaft 21 can be completely absorbed by the inner ring 8. This allows energy to be generated/harvested effectively.

The invention claimed is:

1. A handheld medical instrument that is motor-operated or hand-operated, the handheld medical instrument comprising:
   a plurality of bearings for supporting a shank or shaft for applying torque to a tool;
   a distance sleeve having an inner surface and a defining a radial recess extending into the inner surface;
   a component lying at least partly radially inside the distance sleeve;
   at least one permanent magnet attached to or configured in the component; and
   a coil disposed in the radial recess in the distance sleeve,
   at least two of the plurality of bearings forming a pair of bearings comprising a first bearing and a second bearing,
   the distance sleeve axially spacing the first bearing and the second bearing,
   the component being tubular and rotatably coupled or coupleable with at least one of the first bearing and the second bearing in such a way that the component co-rotates with a respective rotating part of said at least one of the first bearing and the second bearing or to form a rotating part of said at least one of the first bearing and the second bearing.

2. The handheld medical instrument according to claim 1, wherein the first bearing and the second bearing are roller bearings, and the component is a common part of ball cages of the first bearing and the second bearing, which couples the ball cages of the first bearing and the second bearing to each other in a rotationally fixed manner.

3. The handheld medical instrument according to claim 2, wherein the roller bearings are ball bearings.

4. The handheld medical instrument according to claim 1, wherein the component is a shaft portion of the tool.

5. The handheld medical instrument according to claim 1, wherein the first bearing and the second bearing are roller bearings and the component is a common part of inner rings of the first bearing and the second bearing, which couples the inner rings of the first bearing and the second bearing in a rotationally fixed manner.

6. The handheld medical instrument according to claim 5, wherein the component forms a cylindrical portion.

7. The handheld medical instrument according to claim 1, wherein the handheld medical instrument is a hand instrument having a handpiece or gripping section.

8. The handheld medical instrument according to claim 7, wherein the handpiece or gripping section accommodates a motor which is rotationally coupled or rotationally couplable to the shank or shaft for torque transmission to the tool, wherein the first bearing and the second bearing as well as the distance sleeve are arranged in an instrument elongation shaft which is coupled or couplable to the handpiece or gripping section.

9. The handheld medical instrument according to claim 8 further comprising a coupling that is manually-operable and coupleable to the motor, wherein the instrument elongation shaft is coupleable to the handpiece or gripping section with the coupling, and the shaft is coupleable to the motor with the coupling.

10. The handheld medical instrument according to claim 9, wherein the instrument elongation shaft is mechanically and/or electrically connectable to the handpiece or gripping section with the coupling.

11. The handheld medical instrument according to claim 9, wherein the handpiece or gripping section has a first distal end portion at which the coupling is arranged, wherein a tool receptacle is arranged at a second distal end portion of the instrument elongation shaft.

12. The handheld medical instrument according to claim 1, wherein the first bearing and the second bearing including at least the distance sleeve and the component forms a separate unit for mounting into the handheld medical instrument.

13. The handheld medical instrument according to claim 1, wherein the distance sleeve is an integral part of the handheld medical instrument.

14. The handheld medical instrument according to claim 1, wherein the coil is single-layered when viewed in a radial direction of the distance sleeve.

15. The handheld medical instrument according to claim 1, wherein:
the component comprises an outer jacket surface and a plurality of recesses on the outer jacket surface,
the at least one permanent magnet comprises a plurality of permanent magnets that correspond in number to the plurality of recesses, and
the plurality of permanent magnets are insertable into the plurality of recesses.

16. The handheld medical instrument according to claim 1, wherein at least the distance sleeve has radially inner signal lines electrically connected to the coil and radially outer signal lines coupled via electrical couplings to signal lines in the bearings so as to conduct electrical signals from the coil proximally along the handheld medical instrument.

17. A medical instrument that is motor-operated or hand-operated, the medical instrument comprising:
a plurality of bearings for supporting a shank or shaft for applying torque to a tool;
a distance sleeve;
a component lying at least partly radially inside the distance sleeve;
at least one permanent magnet attached to or configured in the component; and
a coil disposed on or in the distance sleeve,
at least two of the plurality of bearings forming a pair of bearings comprising a first bearing and a second bearing,
the distance sleeve axially spacing the first bearing and the second bearing,
the component being tubular and rotatably coupled or coupleable with at least one of the first bearing and the second bearing in such a way that the component co-rotates with a respective rotating part of said at least one of the first bearing and the second bearing or to form a rotating part of said at least one of the first bearing and the second bearing,
the component comprising an outer jacket surface and a plurality of recesses on the outer jacket surface,
the at least one permanent magnet comprising a plurality of permanent magnets that correspond in number to the plurality of recesses, and
the plurality of permanent magnets being insertable into the plurality of recesses.

18. A medical instrument that is motor-operated or hand-operated, the medical instrument comprising:
a plurality of bearings for supporting a shank or shaft for applying torque to a tool;
a distance sleeve;
a component lying at least partly radially inside the distance sleeve;
at least one permanent magnet attached to or configured in the component; and
a coil disposed on or in the distance sleeve,
at least two of the plurality of bearings forming a pair of bearings comprising a first bearing and a second bearing,
the distance sleeve axially spacing the first bearing and the second bearing,
the component being tubular and rotatably coupled or coupleable with at least one of the first bearing and the second bearing in such a way that the component co-rotates with a respective rotating part of said at least one of the first bearing and the second bearing or to form a rotating part of said at least one of the first bearing and the second bearing, and
at least the distance sleeve having radially inner signal lines electrically connected to the coil and radially outer signal lines coupled via electrical couplings to signal lines in the bearings so as to conduct electrical signals from the coil proximally along the medical instrument.

* * * * *